United States Patent [19]

Casper et al.

[11] Patent Number: 5,185,862
[45] Date of Patent: Feb. 9, 1993

[54] APPARATUS FOR CONSTRUCTING DATA FRAMES FOR TRANSMISSION OVER A DATA LINK

[75] Inventors: Daniel F. Casper, Poughkeepsie; Thomas A. Gregg, Highland; John R. Flanagan, Staatsburg, all of N.Y.; Matthew J. Kalos, Tucson, Ariz.; Bjorn O. Liencres, Palo Alto, Calif.

[73] Assignee: International Business Machines Corp., Armonk, N.Y.

[21] Appl. No.: 428,798

[22] Filed: Oct. 30, 1989

[51] Int. Cl.$^5$ ............................................. G06F 13/00
[52] U.S. Cl. ................................. 395/250; 370/94.1; 395/275
[58] Field of Search ............... 364/DIG. 1, DIG. 2; 370/94.1; 395/250, 275

[56] References Cited

U.S. PATENT DOCUMENTS

| | | |
|---|---|---|
| 4,006,465 | 2/1977 | Cross et al. . |
| 4,241,398 | 12/1980 | Carll . |
| 4,284,953 | 8/1981 | Hepworth et al. . |
| 4,675,864 | 6/1987 | Bliek et al. . |
| 4,744,083 | 5/1988 | O'Neill et al. ........................ 371/5.1 |

Primary Examiner—Robert L. Richardson
Attorney, Agent, or Firm—Floyd A. Gonzalez

[57] ABSTRACT

An outbound frame state machine (OFSM) which generates data frames for transmission over a data link. The OFSM is microcode controlled and includes an outbound frame header buffer for containing information to be included in the header of the frame, a data buffer for storing data characters to be included in the data frame, a data generator register for providing special sequences of data characters, if required, and an outbound frame trace buffer for storing a trace log of all frames transmitted in the normal mode and to be used if the OFSM is operating in the simulated I/O mode or the diagnostic mode. In the normal mode of operation, the OFSM builds a data frame using header information from the frame heater bufferm and may include data from the data buffer, all as specified by control bits stored in a control register. The control register may also include a bit for causing special sequences to be transmitted. In the simulation mode, frames are built by the OFSM and then wrapped back to the channel to be processed like frames from a control unit. In the diagnostic mode, the OFSM inserts various characters into the outbound data bit stream to create possible error situations on the data link.

10 Claims, 7 Drawing Sheets

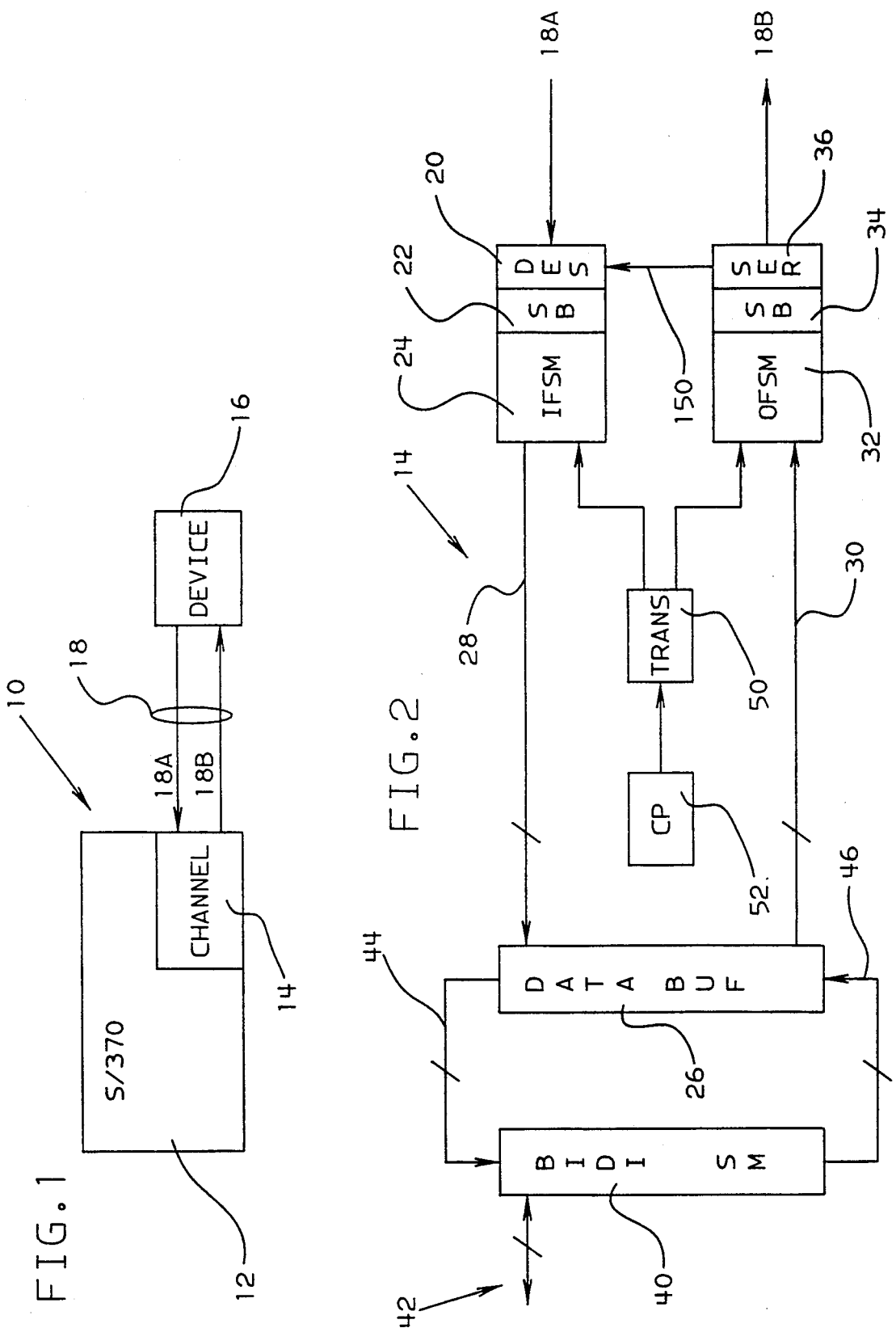

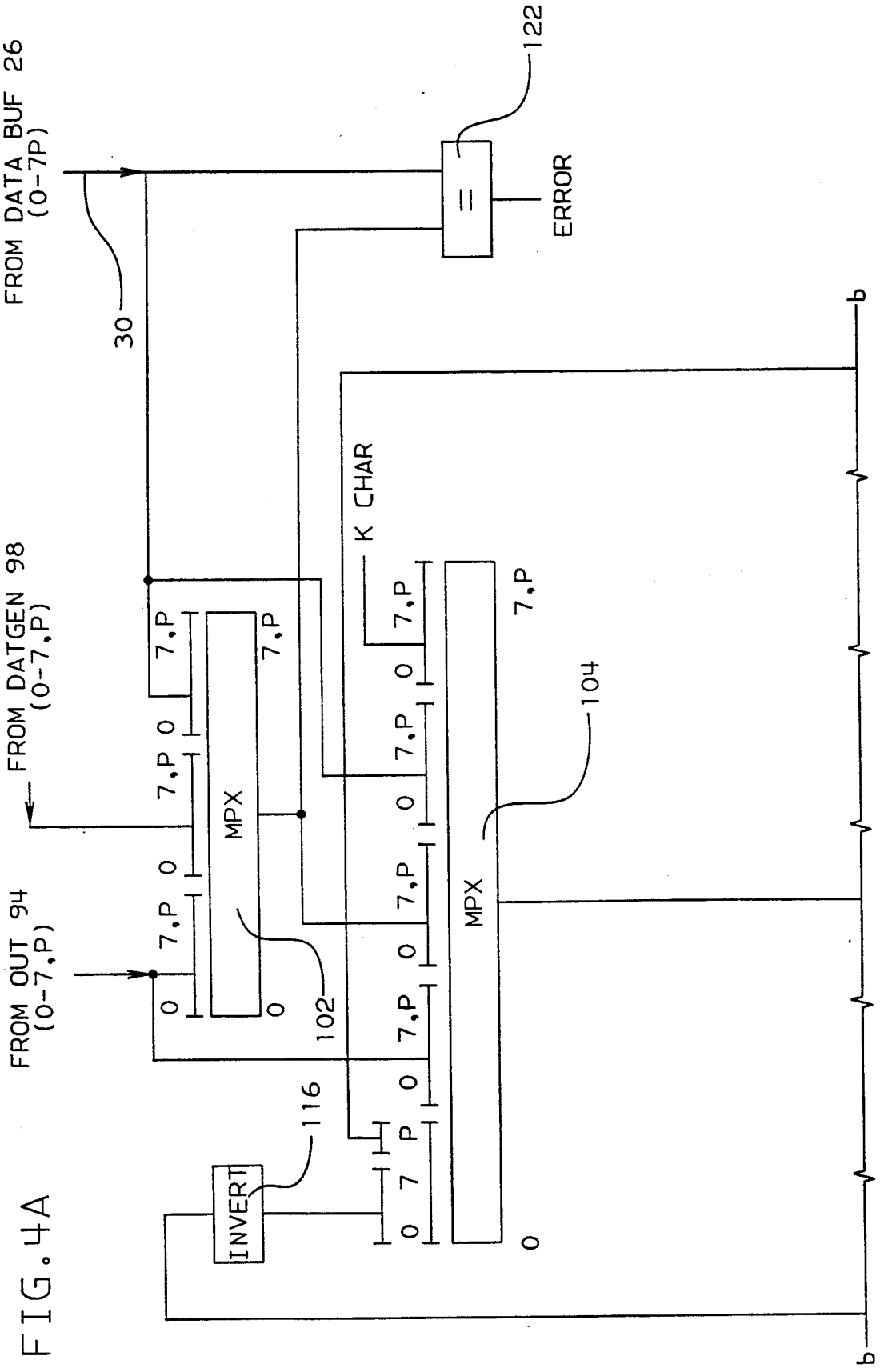

APPARATUS FOR CONSTRUCTING DATA FRAMES FOR TRANSMISSION OVER A DATA LINK

BACKGROUND OF THE INVENTION

The present invention relates to a data processing system channel which receives and transmits data frames over a data link, and more particularly relates to an apparatus for constructing data frames for transmission over the data link.

It is well known that data messages transmitted over a data link in a data processing system are preceded and followed by header and trailer fields for specifying the contents of the data message. These header and trailer fields typically are made up of special characters which may be independently recognized by a receiver of the message. In high speed data links, it is desirable to construct the header and trailer fields using special purpose hardware, while controlling transmission of data with a channel processor.

U.S. Pat. No. 4,006,465 issued Feb. 1, 1977 for "Apparatus For Control and Data Transfer Between a Serial Data Transmission Medium and a Plurality of Devices" to Cross et al, discloses an apparatus under a microprocessor control for use in communicating over a serial communication loop with a remote attached control unit. The disclosed apparatus is capable of establishing frame synchronization, interpreting commands, assembling data and transmitting bits on the loop. For output operations to a device, the microprocessor loads the device address and a device command or data into shift registers, and initiates the transfer by setting a latch.

U.S. Pat. No. 4,241,398 issued Dec. 23, 1980 for "Computer Network, Line Protocol System" to Carll, discloses a low overhead line protocol format for controlling the asynchronous exchange of digital signal information between a central processing unit and one or more remote processing units of a supervisory control system. Digital signal information is converted into serial bits and organized into bit cells in the information field of one or more serial data frames of a message unit, each frame including a header field and a trailer field.

U.S. Pat. No. 4,284,953 issued Aug. 18, 1981 for "Character Framing Circuit" to Hepworth et al, discloses a digital logic circuit which provides character framing for a continuous stream of synchronous serial data characters.

U.S. Pat. No. 4,675,864 issued Jun. 23, 1987 for "Serial Bus System" to Bliek et al, discloses a serial bus system in which frames are sent from a central station to a plurality of substations over a first conductor, and information is sent from the substation to the central station over a second conductor. Each transmitted frame contains bits identifying whether it is for address, data or a command.

SUMMARY OF THE INVENTION

The present invention relates to an apparatus which constructs a frame to be transmitted over a data link. A data buffer is provided for storing data to be transmitted in the frame, a header buffer controlled by a processor for storing information to be loaded in a header field of the frame, and a control register for containing a description of the frame to be generated. A state machine transmits the contents of the header buffer and data from the data buffer in accordance with the description of the frame to be generated from the control register. The apparatus also includes a trace buffer which, in a first normal mode of operation records a copy of the frames transmitted by the apparatus over the data link, for tracing purposes. In a second and third mode of operation, the trace buffer may be loaded with multiple entries of data by the processor for transmission over the data link to either simulate data frames in a simulation mode to test circuitry in the data processing channel, or to insert data onto the data link in a diagnostic mode to diagnose the ability of the data processing channel to handle, for instance, incorrect data characters or noise on the data link.

It is thus a primary object of the present invention to provide an apparatus for constructing data frames for transmission over a data link, wherein the apparatus includes a data buffer for storing data to be transmitted in the frame, a header buffer for storing frame header information, a control register for containing a description of the frame to be generated, and a state machine for constructing a frame to be transmitted using the contents of the header buffer and the data buffer in accordance with the description in the control register.

It is a further object of the present invention to provide an apparatus for constructing frames to be transmitted over a data link, wherein the apparatus includes a trace buffer which in the normal mode of operation stores a copy of data frames transmitted over the data link, and which in a simulation or diagnostic mode, provides data placed in the trace buffer by the processor onto the data link, to either simulate the transmission of data frames or provide diagnostic data.

It is a further object of the present invention to provide a state machine which transmits different types of header fields in a frame transmitted over the data link depending upon which bits are set in the control register.

It is a further object of the present invention to provide an apparatus for constructing data frames which controls the number of idle characters generated between frames dependent upon a value loaded by the processor into registers of a pacing circuit.

The foregoing and other objects, features and advantages of the invention will be apparent from the following more particular description of the preferred embodiment of the invention as illustrated in the drawings.

BRIEF DESCRIPTION OF THE DRAWINGS

FIG. 1 is an overall view of a data processing system having a channel, a remote device, and a data link between the channel and device;

FIG. 2 is a block diagram of the channel of FIG. 1 in which the channel includes a data buffer, an outbound frame state machine for constructing frames to be placed on the data link, and a processor for controlling the transfer of data from the data buffer to the outbound frame state machine;

FIGS. 4A and 4B, joined along line b—b form another portion of the data flow through the outbound frame state machine of FIG. 2;

DESCRIPTION OF THE PREFERRED EMBODIMENT

Figure 3A:
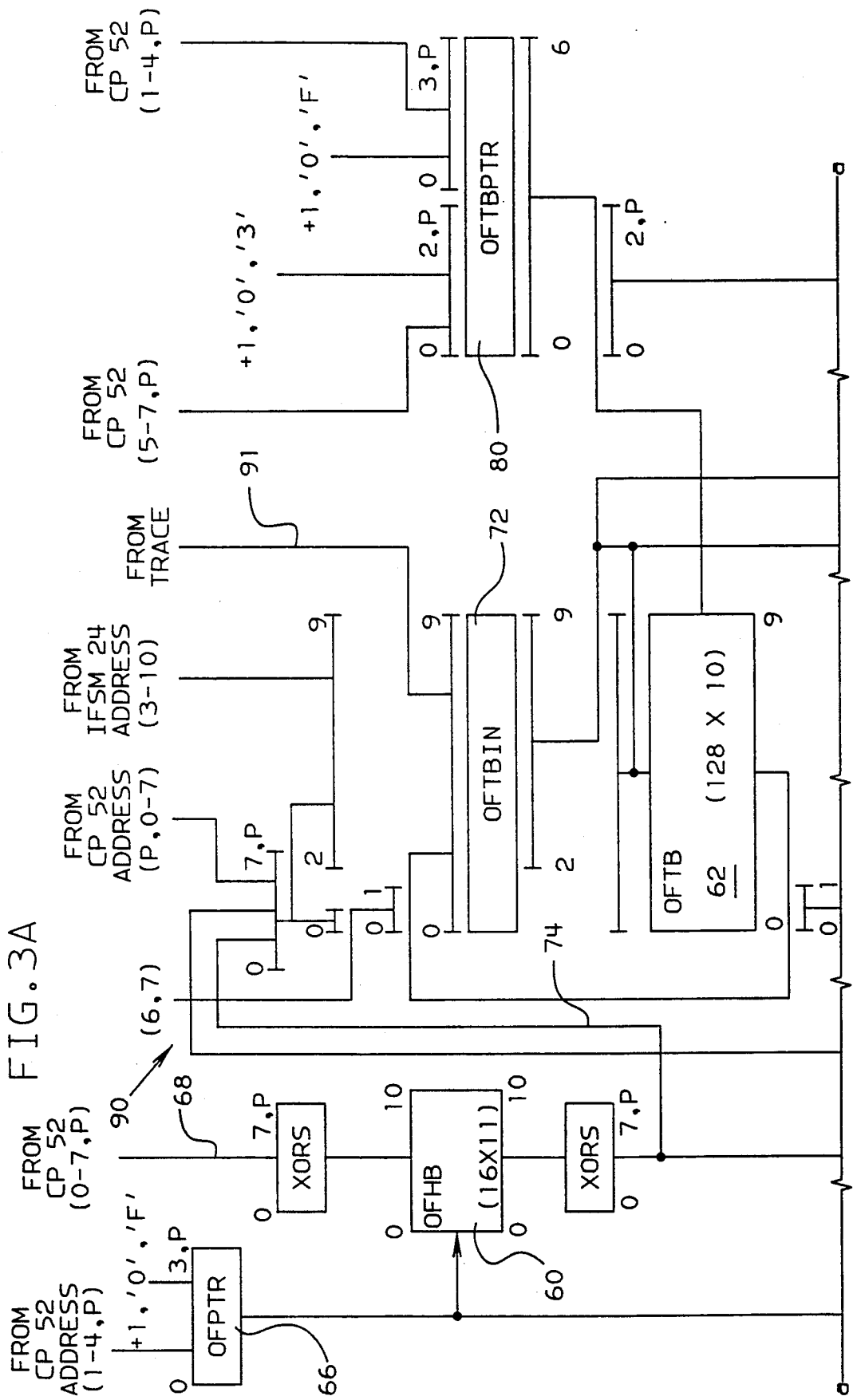
FIGS. 3A and 3B, joined along line a—a, form a portion of the data flow of data through the outbound frame state machine of FIG. 2.

FIG. 1 is an overall view of a data processing system 10 usable with the present invention. The data processing system 10 includes a computer 12 such as an IBM System/370 machine, which further includes one or more channels 14 having data input and output capabilities. The channel 14 is connected by a data link 18 to a device 16. In the preferred embodiment, the data link 18 includes an input conductor 18a for providing data transmissions from the device 16 to the channel 14, and an output conductor 18b which provides for data transmission from the channel 14 to the device 16. The device 16 may be a peripheral device, a control unit controlling several peripheral devices, or a switch device which provides for switching the data link 18 to anyone of a number of control units or devices.

FIG. 2 is a block diagram of the channel 14 of the data processing system of FIG. 1. The input conductor 18a provides data to a deserializer circuit 20 whose output is connected to an input synchronizer buffer 22. The synchronizer buffer 22 is connected to an inbound frame state machine (IFSM) 24. The synchronizer buffer 22 provides an interface between the deserializer circuit 20 and the inbound frame state machine 24 such that data may be received by deserializer circuit 20 at a different rate than it is processed by the inbound frame state machine 24. Data from the inbound frame state machine 24 is provided to a data buffer 26 over a multibit data bus 28. On the output side, data from the data buffer 26 is transmitted over a multibit data bus 30 to an outbound frame state machine 32, whose output is connected to an outbound synchronizing buffer 34. Data from the outbound synchronizing buffer 34 is provided to a serializer circuit 36, whose output is connected to the output conductor 18b of the data link 18. The data buffer 26 is connected to a bidirectional state machine 30 which controls data transfers between the system bus 42 of the System/370 machine 12 and the data buffer 26 over input and output intermediate data busses 44 and 46, respectively.

In the preferred embodiment, input data over input conductor 18A and output data over output conductor 18B is organized in data frames containing a start of frame header and an end of frame trailer. Also transmitted over the data link 18 are certain control frames for controlling and reporting the status of the device 16, also having start of frame headers and end of frame trailers. The inbound frame state machine 24 decodes the incoming frames to divide incoming data from device commands, and the outbound frame state machine 32 constructs the outbound data and command frames. In the preferred embodiment, the decoding and building of frames by the inbound state machine 24 and the outbound frame state machine 32, respectively, is performed, where possible, by hardware contained in a transfer circuit 50 for speed of operation. Certain registers and counters and the transfer circuit 50 and the state machines 24 and 32 are loaded and controlled by a channel processor 52.

The outbound frame state machine 32 of the present invention operates in one of three basic modes; the normal mode, the simulated I/O mode, and the diagnostic mode. In the first mode, outbound frames are constructed using frame headers from an outbound frame header buffer and data from the data buffer 26 of FIG. 2. The outbound frame is constructed in accordance with control bits from an outbound frame control register. In the simulated I/O mode, the frame headers come from an outbound frame trace buffer, and frame data comes from either a data generator register or the outbound frame trace buffer. In the diagnostic mode, an 8 to 10 encoder normally used in the other two modes is bypassed and 10 bit data characters from the outbound frame trace buffer is inserted into the outbound character stream.

FIGS. 3A, 3B, 4A and 4B, when taken together, form a block diagram showing the data flow through the outbound frame state machine circuit 32. Included in the circuit 32 is an outbound frame header buffer 60, an outbound frame trace buffer 62 and an outbound frame control register 64. The outbound header buffer 60 is a 16×11 bit single port array addressed by a four bit outbound frame pointer register 66 which is loaded by an address from the channel processor 52 of FIG. 2. Data to be loaded into the outbound frame header buffer 60 is also supplied by a data bus 68 from the channel processor 52. Outbound frame header buffer bits 0 through 2 are used for parity checking, described later, and bits 3 through 10 form 8 bit data characters as described in U.S. Pat. No. 4,486,739 to Franaszek et al, and assigned to the assignee of the present invention. As described in that patent, these 8 bit data characters will be converted to a 10 bit code for transmission over the data link 18 by an 8 to 10 encoder. The output of the outbound frame header buffer 60 is provided to the processor over bus 70, to the outbound frame control register 64, and to an outbound frame trace buffer input register 72 over bus 74 directly from the outbound frame header buffer 60 and bus 76 from the outbound frame control register 64.

The outbound frame trace buffer 62 is a 128 by 10 bit single port array addressed by a 7 bit outbound frame trace buffer pointer register 80. The pointer bits 0 through 2 address one of the 8 segments within the outbound frame trace buffer 62, and the bits 3 through 6 address one of the 16 elements within an outbound frame trace buffer segment. The 10 outbound frame trace buffer bits are used in the three aforementioned modes. In the normal mode, while tracing, bits 0 and 1 are used for parity checking and k character tracing, to be explained, and bits 2 through 9 are used as data bits. In the simulation mode, bits 2 through 9 are for data and 0 is for checking In diagnostic mode, the 10 bits are used to store encoded link characters for diagnostics. The outbound frame trace buffer address bits are supplied to the pointer register 80 by the channel processor 52 of FIG. 2. It will be noted that both the input and the output of the outbound frame trace buffer 62 are connected to the outbound frame trace buffer input register 72 which is used to platform data when reading and writing to the buffer array 62. As mentioned previously, in the normal mode of operation, the outbound frame trace buffer 62 stores a trace log of the data frames constructed by the outbound frame state machine circuit 32. For this reason, the input buffer 72 receives data from the channel processor 52 by means of input 90, a copy of data sent to the 8 to 10 encoder 86 via bus 91 shown in FIGS. 3A, 3B, 4A and 4B, and data from the outbound frame header buffer 60 via bus 74 and the outbound frame control register 64 via bus 76. The trace buffer 62 is also connected to an output register 94 and the control register 64. The output register 94 is also connected to the output of the output frame header buffer 60 via bus 96. A data generator register 98 has its input connected to the output of the trace buffer 62 via bus 100 and used to generate data patterns for the simulation mode of operation and is a general platform register for the circuit 32, and will be described.

Figure 3B:
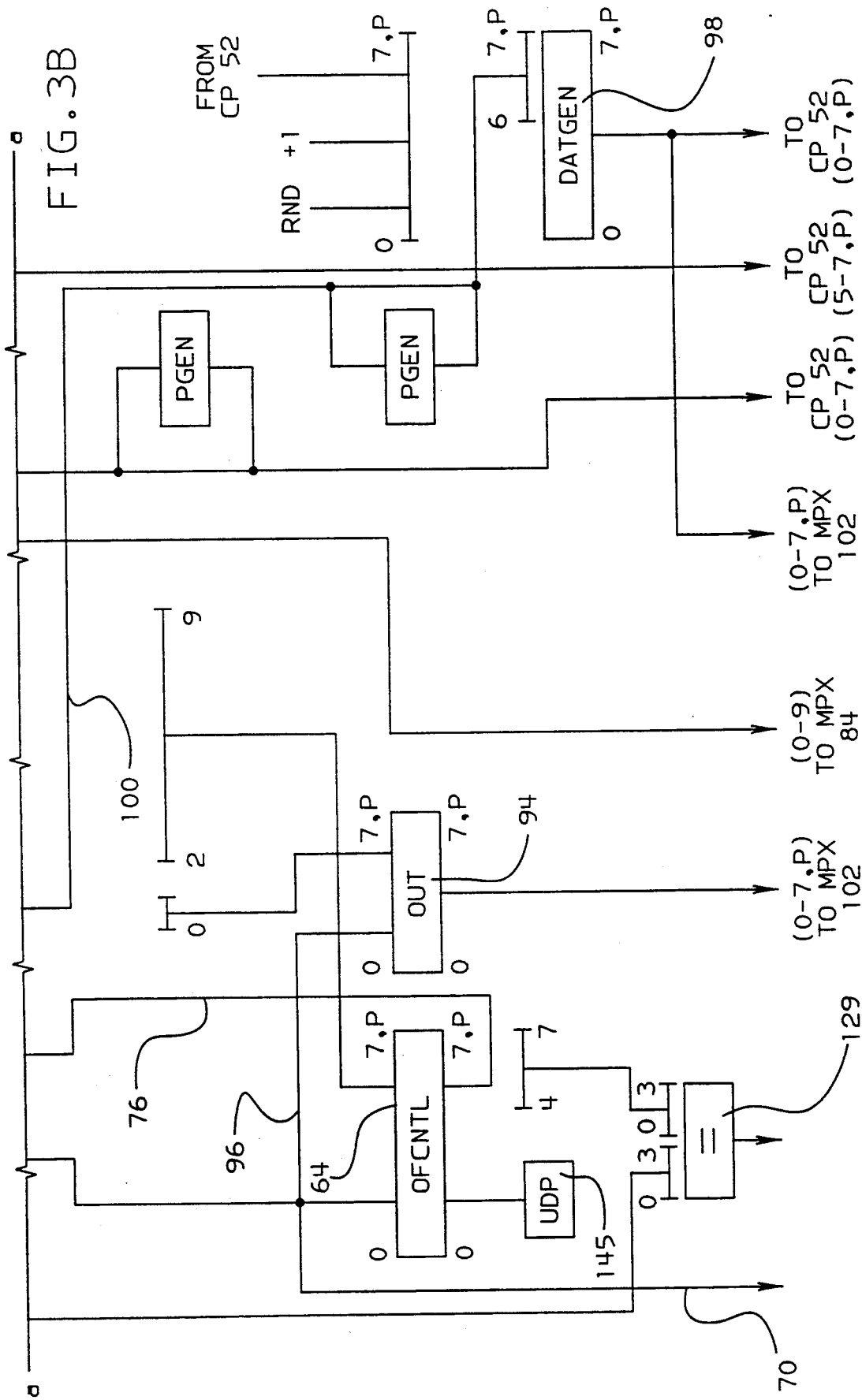
Figure 4B:
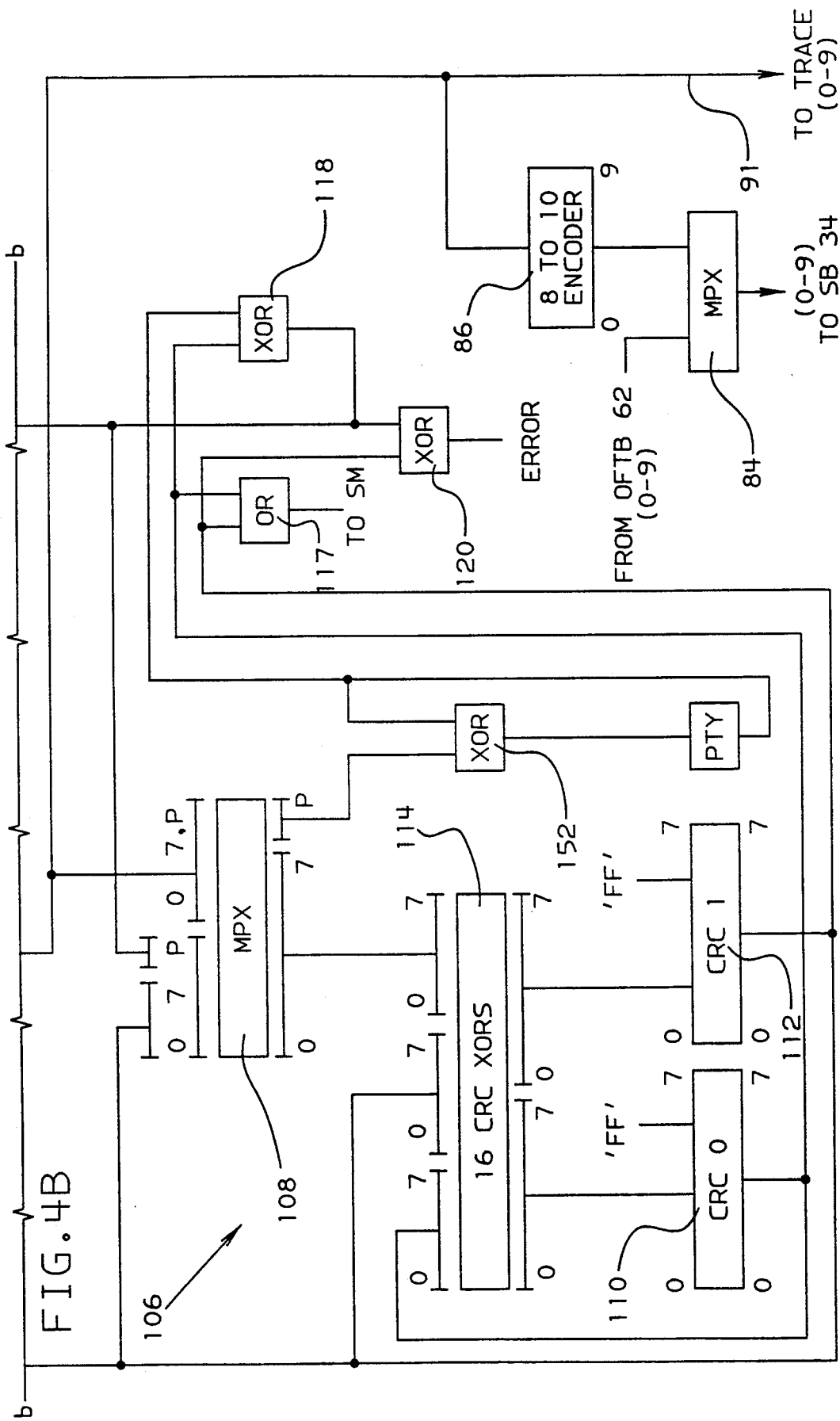

Turning now to FIGS. 4A and 4B, a first multiplexor 102 selects data from the output register 94 of FIG. 3B, the data generator register 98 of FIG. 3B, or the data buffer 26 via bus 30 shown in FIGS. 2 and 4. A second multiplexor 104 selects data from a cyclic redundancy code circuit 106, to be described, the output register 94 of FIG. 2, the output of multiplexor 102, data from the data buffer 26, or a k character used as special characters such as idle, as described in connection with the aforementioned Franaszek et al patent. The output of the multiplexor 104 is provided to the input of the 8 to 10 encoder 86 and to the trace buffer 62 via the bus 91, previously described. A multiplexor 108 selects data from the multiplexor 104 or the output of the cyclic redundancy code circuit 106.

The cyclic redundancy code circuit 106 generates a 2 byte check polynomial which is the remainder resulting from the division of all frame data bytes by a check polynomial of the form:

$$X^{}15 + X^{}12 + X^{**}5 + 1.$$

The hardware consists of two 8 bit registers CRC0 and CRC1, 110 and 112 respectively, and a group of 16 exclusive OR trees 114. Eight of the exclusive OR trees feed the CRC0 register 110 while the other eight trees feed the crc1 register 112. The inputs to the exclusive OR trees 114 are fed from the byte wide output data stream from the multiplexor 108 and the data streams from the CRC0 and CRC1 registers 110 and 112. At the beginning of frame generation, the CRC0 and CRC1 registers 110 and 112 are loaded with all 1's ('FFFF'x). Both of the CRC registers 110 and 112 are loaded from the exclusive OR trees 114 each time a data byte is generated. After all of the data bytes have been generated, the two byte check polynomial is in the crc registers 110 and 112. These are two bytes are gated to the outbound data stream by multiplexor 104 at the end of the frame. These two check bytes are inverted by inverter 116 before sending them on the outbound link through the 8 to 10 encoder 86 and the multiplexor 84. As the CRC bytes are transmitted, they are sent through the exclusive OR trees 114. The resulting value in the CRC registers 110 and 112 should be zero if there were no errors in the crc generation hardware. A non zero value is detected by a 16 way OR gate 117 which generates a hardware error.

The control bits for controlling the building of a frame by the outbound frame state machine circuit 32 are loaded in the 16th entry of the outbound frame header buffer 60. From there, they are loaded into the outbound frame control register 64 to control a state machine in building the outbound frame. When the microcode of the channel processor 52 is ready to send an outbound frame, it first loads or modifies the outbound frame header buffer 60 and starts the state machine of FIG. 5 by causing the state machine to set the pointer in pointer register 66 to 'F'x and place this location's contents into the outbound frame control register 64. The values of the control bits and the register 64 are as follows:

bit 0   Start of frame delimiter type. These delimiter types are explained in Patent Application P09-88-011 to Brown et al for "Dynamic Connections", owned by the assignee of the present invention.

bit 1   End of frame delimiter type. These delimiters are also explained in the aforementioned Patent Application P09-88-011.

bit 2   Generate continuous sequence:
When this bit is on, the state machine generates a continuous sequence using the contents of the data generator register 98 as the data character. When this bit is on, all other bits of the control register 64 are ignored. The sequence can be altered at any time by changing the contents of the data generator register 98. The continuous sequence can be stopped by the channel processor 52.

bit 3   Append data:
When this bit is on, the state machine generates a data frame. After the header data is transmitted, the state machine transmits additional data from various sources, usually the data buffer 26. The append data bit also controls the type of pacing used, to be described later.

bits 4-7   Header count:
These four bits specify the number of bytes to be read from the frame header. These bytes are read sequentially from the header buffer 60 starting from address 0. When the append data bit is off, the header count is the total length of the frame information field. When the append data bit is on, data from various sources, normally the data buffers 26, is added after the header. The value of this count can be from 1 to 15.

Figure 5:
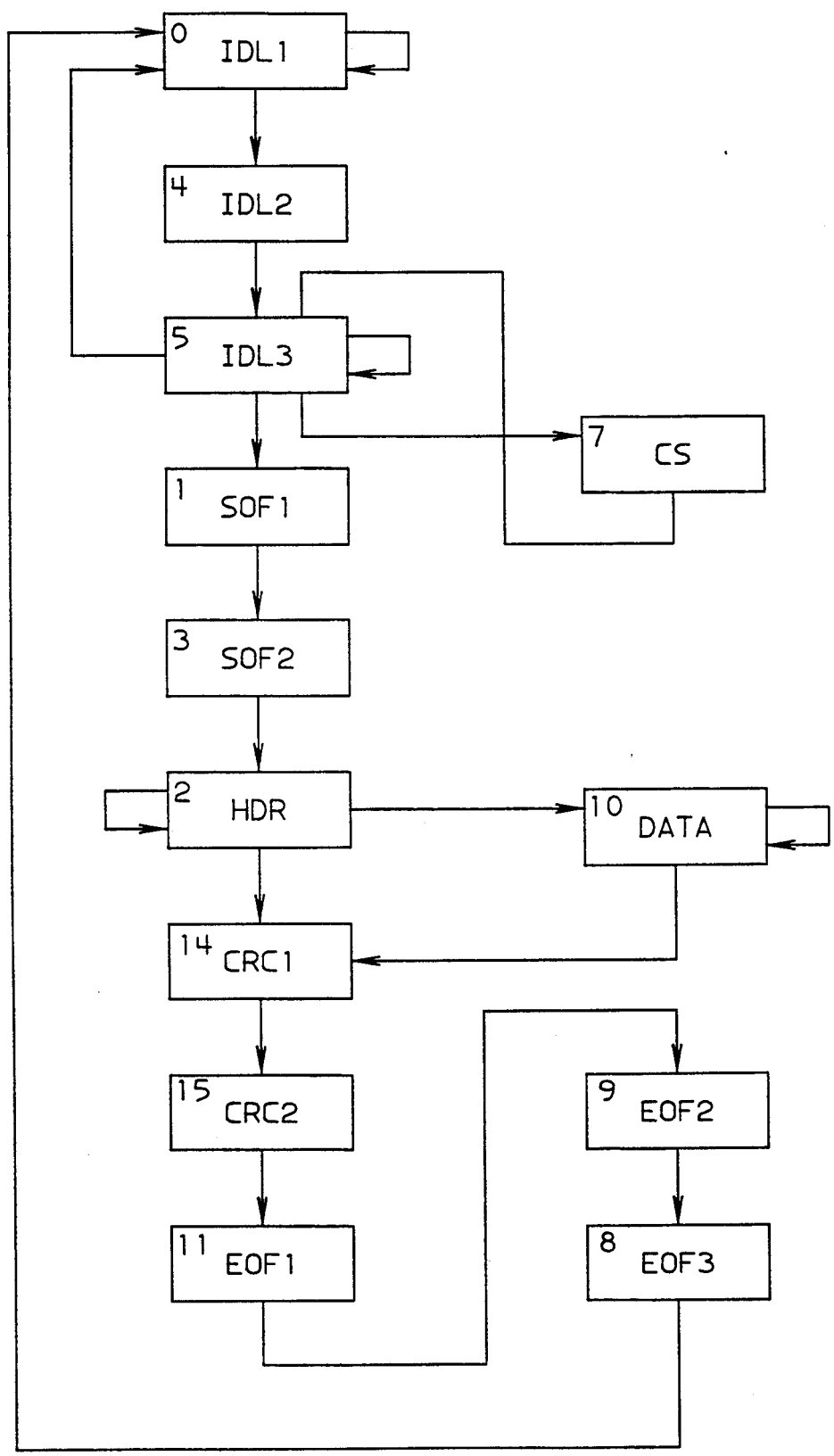
FIG. 5 is a diagram of the states of a state machine and the outbound frame state machine circuit of FIG. 2.

The outbound frame state machine 32 includes a state machine whose state controls the data flow of data through the circuit of FIGS. 3A, 3B, 4A and 4B. FIG. 5 shows the states of the state machine. The state machine can be in one of a four bit state, wherein 13 of the 16 code points are valid. The valid code points are as follows:

0   IDL1. The idle sequence is being generated. In this state, the state machine is completely idle, and is waiting for the frame to be started by the microcode.

4   IDL2. The idle sequence is being generated. This state is used by the state machine when the frame has been started by the microcode, and the state machine is reading the header buffer 60 to acquire the control byte.

5   IDL3. The idle sequence is being generated. In this state, the state machine has loaded the control register 64. If pacing parameters have been met and the data is available (when the append data bit of the control register 64 is set), the state machine steps to the SOF1 state. The state machine remains in the IDL3 state until the above conditions are met.

7   CS - Continuous sequence state. When the state machine is instructed to generate continuous sequences, it alternates between this state and the IDL3 state. In the IDL3 state, the idle character of the continuous state is transmitted; and in the CS state, the data character from the data generator register 98 is transmitted.

1   SOF1 - The first of the two start of frame characters is being generated. If the control bit 0 is a 0, an idle character is generated. If control bit 0 is a 1, a first start of frame character is generated.

3 SOF2 - The second of the two start of frame characters is being generated.

2 HDR - The number of bytes specified by the control bits 4 through 7 is read from the header buffer 60 as determined by comparitor 129 of FIG. 3.

10 DATA - This date is entered if the append data bit in the control register 64 is active. Data bytes are taken from either the data buffer 26, the trace buffer 62, or the data generator DATGEN register 98.

14 CRC1 - This state gates data from the CRC0 register 110 to the outbound data stream through multiplexor 104. From this state the state machine proceeds to state 15.

15 CRC2 - This state gates data from the CRC1 register 112 to the outbound data stream via multiplexor 104. It can only be entered from state 14, and the state machine always proceeds from this state to state 11.

11 EOF1 - The first of the three end of frame characters is being generated. When error conditions are detected by the channel, this state may be entered to generate the abort end of frame delimiter.

9 EOF2 - The second of three end of frame characters is being generated. The exact frame generated depends upon the value of the end of frame delimiter type bit in the control register 64. If, however, the state machine is generating the abort end of frame delimiter, the second abort character is generated.

8 EOF3 - The third of the three EOF characters is being generated. The value of the third character depends upon the value of the end of frame delimiter bit in the control register 64. Again, if the state machine is generating the abort end of frame delimiter, the character generated will be the third character of the abort end of frame delimiter.

6,12,13 These states are invalid and if they are entered, a channel control check will result.

Figure 6:
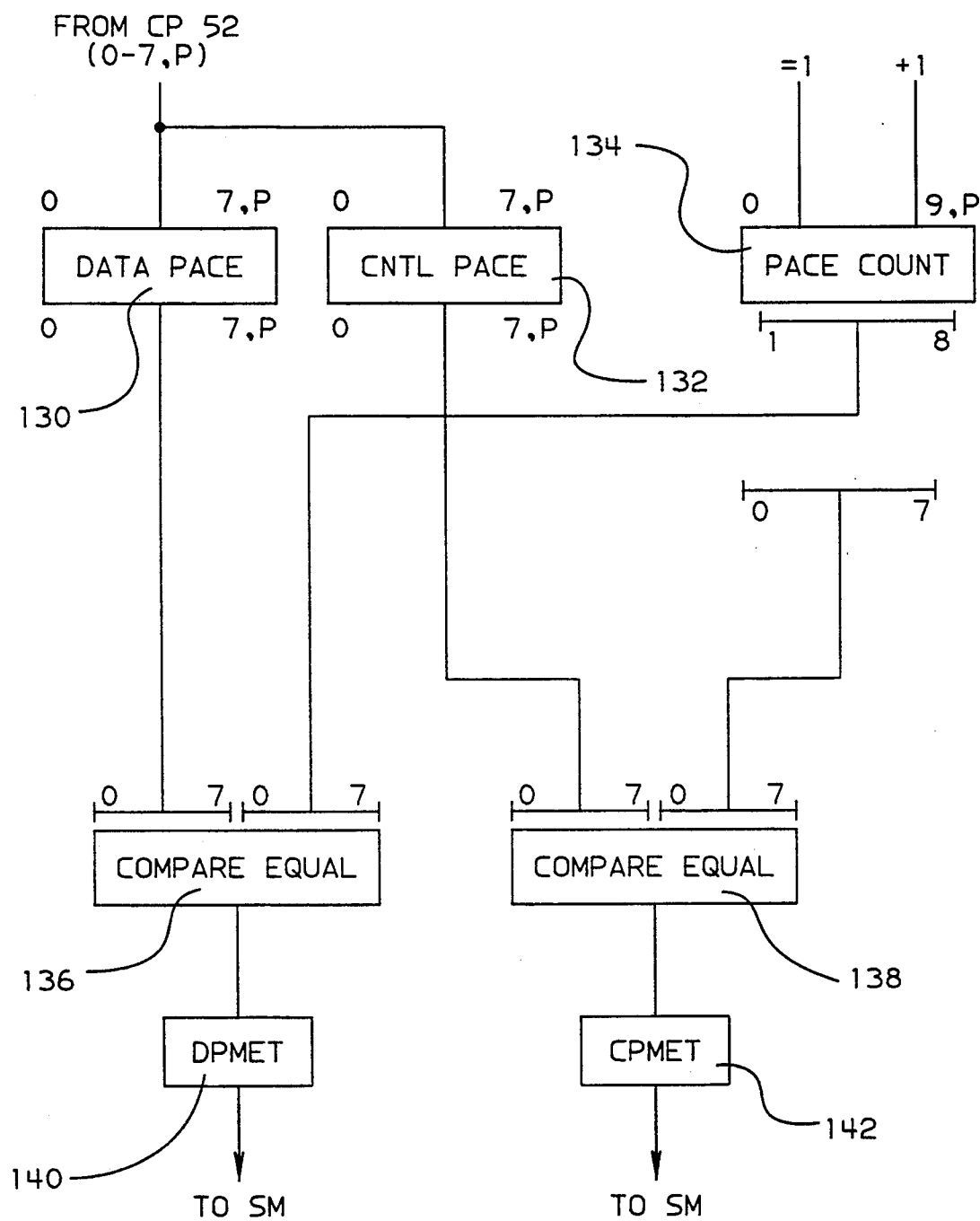
FIG. 6 is a block diagram of the outbound pacing hardware used to control the number of idle characters between frames generated by the outbound frame state machine of FIG. 2.

FIG. 6 is a block diagram of the outbound pacing hardware used to control the number of idle characters between the frames. The hardware includes two one byte registers 130 and 132 which are set from the control processor 16 by microcode. The data pace register 130 controls the minimum number of idle characters between the data frames (those frames generated with the append data bit on), and the control pace register 132 which controls the minimum number of idle characters between frames which do not contain data (those frames generated with the append data bit off). The control pace register 132 also determines the minimum number of idle characters between data and non-data frames. The value in the data pace register 130 is twice the number of idle characters to be inserted between frames, and allows a maximum of 510 idle characters. The value in the control pace register 132 is four times the number of idle characters to be inserted between frames, and allows a maximum of 1,020 idles. In both registers, the value 0 sets the minimum number of idle characters capable of being transmitted by the outbound frame state machine circuit 32.

A 10 bit pace count counter 134 counts the idle characters between frames. Pace counter 134 is reset to 0 when the last of the three end of frame delimiter characters are sent. The value in the pace counter 134 is compared to the values from both the data pace register 130 and the control pace register 132 by a pair of one byte wide comparators 136 and 138, respectively. Pace count bits 1 through 8 are compared to the data pace bits 0 through 7. When these bits are equal, as determined by the comparator 136, a data pace met latch 140 is set. The pace count bits 0 through 7 are compared to the control pace bits 0 through 7 by comparator 138. When these bits are equal, a control pace met latch 142 is set. Both of the data pace met and control pace met latches 140 and 142 are reset at the start of an outbound frame.

A use data pacing latch 145 and the append data bit in the control register 64 of FIG. 3, are used by the state machine of FIG. 5 to determine which of the two pacing latches 140 or 142 is to be used during frame generation. Each time the state machine of FIG. 5 starts to generate a frame, the use data pacing latch 145 is loaded with the value of the append data bit in the control register 64. It will be understood that when the use data pacing latch 145 is set, that the previous frame which set the latch 145 was a data frame, and that if the data append bit is set, that the present frame is a data frame. As a result, the use data pace latch 145 indicates if the last frame generated by the state machine of FIG. 5 was a data frame. The output of the use data pace latch is anded with the append data bit to select the proper pacing parameter met latch 140 or 142. The data pace latch 140 is used to condition frame generation when both the use data pace latch 145 and the append data bits are on. In this way, data pacing is used only between frames which contain data.

Returning now to the operation of the outbound frame state machine 32 and its normal mode of operation, the outbound frame header buffer 60 is used to store a frame header or an entire frame in preparation for outbound frame generation. The first 15 elements of the array 60 are used to store frame headers, and the 16th element is used to store the outbound frame control values. Microcode writes this array by using the SIR-OUTFRMBUS microorder. The address of the array 60 is loaded into the outbound frame pointer register 66, while the data for the array 60 is inputted by the channel processor 52 over bus 68.

When the microcode sends an outbound frame, it first loads or modifies the outbound frame header buffer 60 and starts the state machine of FIG. 5 by causing the state machine of FIG. 5 to set the pointer register 66 to 'F'x, and place the 16th location's array contents into the outbound frame control register 64. This occurs in the IDL2 and IDL3 states of the state machine of FIG. 5. As previously described, the contents of the outbound frame control register 64 describes to the state machine of FIG. 5 the characteristics of the frame to be generated.

After the state machine of FIG. 5 loads the control register 64, it examines the continuous sequence bit. If this bit is on, the state machine of FIG. 5 immediately generates the sequence by switching between the IDL3 and the CS states. If the continuous sequence bit is off, the state machine of FIG. 5 examines the append data bit. This bit not only controls the append data function, but also determines which pacing requirements must be met to allow frame transmission to proceed, as previously described. If the append data bit is on, the state machine of FIG. 5 examines counters in the transfer circuit 50 of FIG. 2 to determine if enough data is available in local buffers to begin frame transmission. The transfer circuit 50 is not part of the present invention, and will not be described further herein.

Once data pacing and data availability requirements have been met, the state machine of FIG. 5 proceeds through the SOF1 and SOF2 states where it generates the proper start of frame delimiter as specified by the start of frame delimiter type bit in the control register 64. The pointer in the pointer register 66 is set to 0, and the first header byte is read from the header buffer 60. The state machine of FIG. 5 proceeds to the HDR state while transmitting the number of header bytes as specified by the header count bit of control register 64.

After transmitting the header, the state machine of FIG. 5 once again examines the append data bit to determine whether it should proceed to the DATA or the CRC1 state. In the CRC1 and CRC2 states, the state machine of FIG. 5 transmits the two byte cyclic redundancy code as previously described. After the CRC transmission, the state machine of FIG. 5 proceeds through the EOF1, EOF2, and EOF3 states. The end of frame delimiter type bit is examined while in the EOF2 and EOF3 states to determine the type of end frame delimiter to transmit. After the EOF3 state, frame transmission is concluded and the state machine of FIG. 5 returns to the IDL1 state to prepare for the next frame.

In the simulation mode of operation, the outbound frame state machine 32 provides hardware facilities for a subroutine of the microcode to simulate a control unit attached to the channel interface. When in the simulation mode of operation, the outbound data bit stream is wrapped back to the inbound data bit stream by a bus 150 shown in FIG. 2. It will be understood that this wrap function can be used to test the circuitry of the circuits 20, 22 or 24, depending upon where and in what form the bit stream is supplied to the inbound circuitry. When the functional code of the channel function of the channel processor 52 sends a frame to the simulated control unit, the frame is not transmitted on the link, but is left in the outbound frame header buffer 60 and the data buffer 26 where the simulation code can examine the frame. When the simulation code generates a frame to the channel, it uses the outbound frame trace buffer 62 and the data generator register 98 to send a frame using the state machine of FIG. 5. This simulation frame is wrapped back to the channel's inbound frame state machine 24 via bus 150. The simulation frame is then processed by the functional code like any other frame received from a control unit. The rerouting of the frames during the simulation mode of operation is accomplished by altering the execution of an instruction of the channel processor 52 so that an interrupt to the simulation code is caused and no frames are generated. When the simulation code gets control, it alters the execution of further microorders so that the outbound frame header buffer 60 is read instead of a similar buffer in the inbound frame state machine 24. Thus, the simulation code reads the outbound frame header buffer 60 as though it was an inframe buffer. The simulation code now loads the outbound frame trace buffer 62 (segment 0, address 0 through 15) instead of the outbound frame header buffer 60. The simulation code then loads the outbound frame trace buffer 62 as though it were an outframe buffer. The state machine of FIG. 5 is used to generate a frame, and send it on the outbound link where it is wrapped back to the channel. When the simulation code finishes, it allows control to be returned to the functional code. In summary, the simulation mode of the outbound frame state machine circuit 32 generates frames using segment 0 of the outbound frame trace buffer as the source of outbound frame control bits and header information.

The simulation code also generates data frames. When the channel control word for passing instructions from the System/370 machine 12 to the channel 14 is a read command, the simulation code uses the data generator register 98 to generate appended frame data. The length of frame data in the data frame being generated is specified by an appropriate data length register (not shown) in the transfer circuit 50. When the channel command word is a write command, the simulation code has to unload the data from the data buffer 26 and compare it to the pattern generated by the data generator register 98 of FIG. 3B by the comparator 122 of FIG. 4B. The modes of data manipulation in the simulation mode of operation is controlled by encode values which are supplied by the simulation microcode. These encodes may provide that data comes from the data buffer 26, that a 40 byte data pattern be generated for transmission or comparison, that a 256 byte incrementing data pattern by the data generator (DATGEN) register 98 for transmission or comparison be generated by DATGEN 98 or that the outbound frame trace buffer 62 be used as the data source starting at address '40'x and wrapping after address '7F'x to '40'x. The DATGEN 98 may operate as a pseudo-random number generator or an incrementor, as specified by the second and third mentioned encodes, respectively.

The diagnostic mode sets two additional encodes. The first specifies that the outbound frame trace buffer be used as a data source (10 bit mode) starting at address '00'x and wrapping after '7F'x to '40'x. In this case, no header, delimiters, or CRC are generated and the number of character transmitted is specified in the data length register. The second specifies that the outbound frame trace buffer 62 be used as the data source (10 bit mode forever) starting at address '00'x and wrapping after addresses '7F'x to '40'x. In this case, transmission continues until ordered to stop, and after the frame is ordered to stop, transmission stops after the current pass through the outbound frame trace buffer 62 at address '7F'x.

The outbound frame trace buffer 62 elements are 10 bits wide with bit 0 being a parity bit, bit 1 a K character bit, and bits 2 through 9 are data bits. Each frame transmitted by the state machine of FIG. 5 causes one entry into the outbound frame trace buffer 62. The trace buffer 62 is divided into 8 segments, each segment containing 16 elements. The 16th element of each segment contains the control bit values used to generate the frame, with elements 0 through 14 tracing the first 15 bytes of the frame data (not included the start of frame delimiter). Frame tracing is continuous with 8 segments always containing the last 8 frames that were transmitted. If the traced frame is more than 15 bytes, tracing continues until 15 bytes are transmitted. If the frame is short enough, the end of frame delimiters and some idle sequence characters are traced in 8 bit form with the K line on. The full 15 byte tracing is truncated if another frame is started immediately after the current frame ends. If the traced frame is more than 15 bytes, only the first 15 bytes are traced and the remaining bytes are not traced. The contents of the trace buffer 62 may be read for logging purposes. Each element requires two array reads, with the first read for bits 2 through 9 and the second read for bits 0 and 1.

In the simulation mode, normal tracing in the outbound frame trace buffer 62 is disabled to prevent overwriting of simulation data in the trace buffer 62, as previously described. As mentioned, the simulation microcode builds a response to the channel in the first segment of the trace buffer 62. The data in this segment is arranged in exactly the same way as that in the header buffer 60. When the simulated frame is started, the state machine of FIG. 5 accesses segment 0 of the trace buffer 62 as though it were the header buffer 60. When the trace buffer 62 is used as a data source in the 8 bit mode, the state machine of FIG. 5 accesses the bottom half of the trace buffer 62 (addresses '40'x through '7f'x), and appends this data to a frame header. In this way, the simulation code sends special data to the channel which cannot be generated by the data generator register 98.

In the diagnostic mode of operation of the outbound frame state machine circuit 32, the state machine of FIG. 5 is also prevented from overwriting the trace buffer 62. The trace buffer 62 is used as a data source for 10 bit data, which is written into the trace buffer 62 in two steps. In this case, the channel processor 52 writes bits 2 through 9 of an element into the trace buffer 62, and then writes bits 0 and 1. The trace buffer 62 may then be used as a data source in the 10 bit mode or the 10 bit mode forever, depending on the length of the test case. When ordered, 10 bit characters from the trace buffer 62 are merged into the outbound bit stream by multiplexor 84 of FIG. 4.

A disparity control function is provided in the diagnostic mode of operation which allows a predictable running disparity from the state machine generated data. Running disparity is fully described in the aforementioned Franaszek patent. After a frame is started, the state machine of FIG. 5 will wait until the 8 to 10 encoder disparity is positive. At this point, the state machine of FIG. 5 bypasses the encoder by switching character transmission from the output of the encoder 86 to the output of the trace buffer 62 by the action of multiplexor 84. While the 10 bit characters are being transmitted from the trace buffer 62, the encoder's disparity is forced positive. The number of characters transmitted from the trace buffer 62 is specified by the data length register when the trace buffer is used as a data source in the 10 bit mode. When the test case ends, the 8 to 10 encoder 86 is no longer bypassed, and its disparity subblock has minus disparity. This disparity control allows writing test cases with the correct disparity and inserting them into the idle stream. The last idle character transmitted by the state machine of FIG. 5 through the encoder 86 has a positive disparity. Therefore, the test case must assume an entry disparity of plus. Since at the end of the test case, the encoder generated characters start with a positive running disparity, the first encoder generated idle has negative disparity (see the aforementioned Franaszek patent). Therefore, the test case should have a positive entry and exit disparity. The test case can be either an odd or even number of characters and can be padded with idle characters at the beginning and/or end of the test case to produce any valid 10 bit pattern.

The header buffer 60 has three parity bits used for error detection. When writing the array, these bits are predicted from the parity of the outbound frame pointer register 66, the data parity and the data itself. The exclusive OR gates 118, 120 and 152 of FIG. 4B are arranged to detect multiple adjacent errors in an array element. When the array is read, the parity bits are checked with the appropriate data and the parity bits of the pointer register 66, an odd parity for the data is predicted if there are no errors.

While we have illustrated and described the preferred embodiment of our invention, it is to be understood that we do not limit ourselves to the precise construction herein described, and the right is reserved to all changes and modifications coming within the scope of the invention as defined in the appended claims.

Having thus described our invention, what we claim as new, and desire to secure by Letters Patent is:

1. Apparatus for constructing a frame to be transmitted over a data link, said apparatus comprising:
   a data buffer for storing data to be transmitted in the frame;
   a header buffer for storing frame header information;
   a control register for containing a description of the frame to be generated; and
   state machine means for constructing a frame to be transmitted using the contents of said header buffer and said data buffer in accordance with the description in said control register.

2. The apparatus for constructing a frame of claim 1 further comprising a multiple entry trace buffer for storing a duplicate of the frame transmitted over said data link.

3. The apparatus for constructing a frame of claim 2 wherein said state machine includes a continuous sequence state wherein a continuous sequence is generated, and a plurality of other states wherein a frame is generated, said frame having a start of frame delimiter, a header, a plurality of data bits, and an end of frame delimiter.

4. The apparatus for constructing a frame of claim 3, said apparatus further comprising a processor means connected to said header buffer for loading the contents of said frame header into said header buffer, and connected to said control register for loading a control byte in said control register.

5. The apparatus of claim 4 wherein said control register is a multibit latch having a bit settable by said processor means for placing said state machine in said continuous sequence state, said apparatus further comprising a DATGEN register loadable by said processor means and having an output controllable by said state machine such that said continuous sequence includes the contents of said DATGEN register.

6. The apparatus of claim 5 wherein said control register further includes bits settable by said processor means, said settable bits controlling the type of said start of frame delimiter, the type of said end of frame delimiter, and append bit to indicate if data from said data buffer is to be included in the frame, and a plurality of bits having a value equal to the length of the header field to be transmitted in the frame from said header buffer.

7. The apparatus of claim 6 further comprising a data pace register loadable by said processor means for controlling the number of idle characters generated by said state machine between frames if said append data bit of said control register is on, and a control pace register loadable by said processor means for controlling the number of idle characters generated by said state machine between frames if said append data bit of said control register is not on.

8. The apparatus of claim 7 further comprising a use data pacing latch connected to said control register, said use data pacing latch latching the state of said append data bit, said use data pacing latch further connected to said state machine for controlling which of said data pace register and said control pace register is to be used for generating idle characters between frames.

9. The apparatus of claim 8 further comprising a pointer latch for receiving addresses from said processor means, said pointer latch connected to the address terminal of said trace buffer; and an input register having an input connected to said processor means and an output connected to the data terminal of said trace buffer;

said trace buffer further having an output connected to the data link such that multiple entries of data may be placed into said trace buffer and outputted onto the data link when said apparatus is operated in one of simulation or diagnostic modes by said processor means.

10. The apparatus of claim 9 further comprising disparity control means in said processor means for controlling the insertion of data from said trace buffer onto the data link such that the disparity of the character stream transmitted over said data link is correct.

* * * * *